(12) United States Patent
Schenck Zu Schweinsberg

(10) Patent No.: US 8,128,003 B2
(45) Date of Patent: Mar. 6, 2012

(54) BURNER FOR HEATING A CATALYTIC CONVERTER WITH OPEN-LOOP OR CLOSED-LOOP CONTROLLED FUEL DELIVERY

(75) Inventor: Alexander Schenck Zu Schweinsberg, Schwieberdingen (DE)

(73) Assignee: Robert Bosh GmbH, Stuttgart (DE)

( * ) Notice: Subject to any disclaimer, the term of this patent is extended or adjusted under 35 U.S.C. 154(b) by 1387 days.

(21) Appl. No.: 11/599,666

(22) Filed: Nov. 14, 2006

(65) Prior Publication Data

US 2007/0157606 A1 Jul. 12, 2007

(30) Foreign Application Priority Data

Nov. 17, 2005 (DE) .................... 10 2005 054 733

(51) Int. Cl.
*F02M 33/02* (2006.01)
(52) U.S. Cl. ......... 237/12.3 C; 60/285; 60/289; 60/300; 60/303; 431/12; 431/75; 431/79
(58) Field of Classification Search ............. 237/12.3 C; 60/285, 289, 300, 303, 274; 431/12, 75, 431/79
See application file for complete search history.

(56) References Cited

U.S. PATENT DOCUMENTS

| | | | | |
|---|---|---|---|---|
| 3,716,996 A | * | 2/1973 | Maruoka | 60/286 |
| 4,887,575 A | * | 12/1989 | Takahashi | 123/435 |
| 5,037,291 A | * | 8/1991 | Clark | 431/12 |
| 5,234,024 A | * | 8/1993 | Stoltman et al. | 137/495 |
| 5,353,591 A | * | 10/1994 | Kabasin et al. | 60/274 |
| 5,379,592 A | * | 1/1995 | Waschkuttis | 60/286 |
| 5,598,816 A | * | 2/1997 | Pedersen | 123/169 EL |
| 5,617,720 A | * | 4/1997 | Achleitner et al. | 60/274 |
| 5,862,661 A | * | 1/1999 | Zhang et al. | 60/274 |
| 6,145,302 A | * | 11/2000 | Zhang et al. | 60/274 |
| 6,338,244 B1 | * | 1/2002 | Guenther et al. | 60/285 |
| 6,925,864 B2 | * | 8/2005 | Beyer et al. | 73/114.32 |
| 2003/0221425 A1 | | 12/2003 | Posselt et al. | |

FOREIGN PATENT DOCUMENTS

| | | |
|---|---|---|
| DE | 2219371 | 2/1973 |
| DE | 41 32 814 C2 | 4/1993 |
| EP | 0 599 060 B1 | 6/1994 |

* cited by examiner

*Primary Examiner* — Steven B McAllister
*Assistant Examiner* — Avinash Savani
(74) *Attorney, Agent, or Firm* — Merchant & Gould P.C.

(57) ABSTRACT

The invention concerns a burner, particularly an auxiliary burner in a motor vehicle and most especially a burner to rapidly heat up a three way catalytic converter of an internal combustion engine of a motor vehicle, with a fuel supply mechanism to deliver fuel to the burner, an air supply mechanism to deliver air to the burner, as well as with an open-loop or closed-loop control mechanism to set a desired fuel-air-ratio in the burner. The invention additionally concerns a procedure to operate such a burner. Provision is made, that the open-loop or closed-loop mechanism adjusts the fuel mass delivered from the fuel supply mechanism to the burner to the air mass delivered from the air supply mechanism to the burner.

10 Claims, 2 Drawing Sheets

Figure 1:
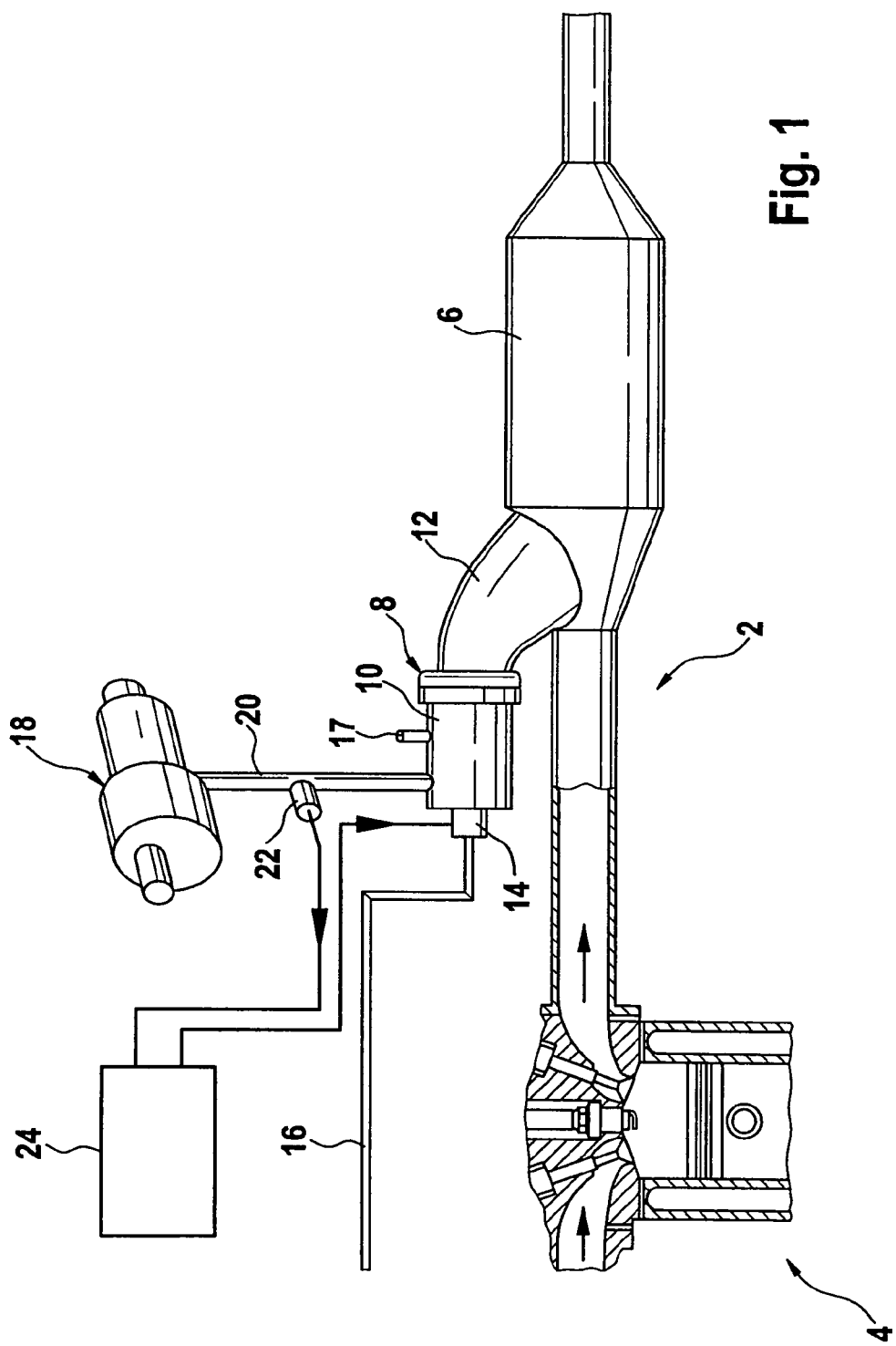

BURNER FOR HEATING A CATALYTIC CONVERTER WITH OPEN-LOOP OR CLOSED-LOOP CONTROLLED FUEL DELIVERY

The invention concerns a burner according to the preamble of the claim 1, especially for the rapid heating of a three way catalytic converter of an internal combustion engine of a motor vehicle as well as a procedure to operate one such burner.

The exhaust gases produced during the operation of gasoline driven internal combustion engines are as a rule led through a three way catalytic converter in the exhaust gas duct in order to clean the exhaust gases of the pollutants produced during combustion by way of a catalytic conversion. In order for this to be effective, the three way catalytic converter must have, however, a certain minimum temperature or light-off-temperature, which it alone achieves by way of the heat of the exhaust gases of the internal combustion engine only approximately 20 to 40 seconds after cold starting the engine. That is why the largest amount of pollutants of modern internal combustion engines are emitted during the time period after the starting of the engine mentioned above in the previous sentence.

In order to shorten the time span until the light-off temperature of a three way catalytic converter is achieved, it was already proposed in 1971 in the German patent DE OS 2219371, that motor vehicles be equipped with an auxiliary burner, in whose combustion chamber fuel is combusted before cold starting of the internal combustion engine. In so doing, the hot exhaust gases produced thereby are used to preheat the catalytic converter. As among other things described in the German patent DE 41 32 814 C2 or in the patent EP 0 599 060 B1, the necessary air required for the combustion of the fuel in the burner is delivered into the burner by means of a secondary air fan, which is normally present in motor vehicles equipped with a gasoline engine.

In order to assure a low emission operation of the burner, the fuel/air ratio in the burner has to lie within a specified range and preferably be held constant. In so doing, a constant amount of fuel as well as a constant amount of air is delivered in known systems into the burner. In order to guarantee the supply of a constant amount of air despite an air conveyance characteristic curve of the secondary air fan, which is beyond the operating time and as the case may be fluctuating, and despite a fluctuating exhaust gas backpressure, a secondary air pressure regulator is deployed in the secondary air delivery pathway behind the secondary air fan in the burner system described in the patent EP 0 599 060 B1. This regulator is connected with the combustion chamber by way of a reference pressure line.

Also in the case of other conceivable solutions, open-loop or closed-loop control measures must be taken on the fuel side as well as the air side for the supply of a constant amount of fuel and a constant amount of air, which especially on the air side almost always require the installation of relatively expensive and complex components.

Besides being used for the rapid heating of a three way catalytic converter, the burners mentioned at the beginning of this application can also be deployed in motor vehicles to regenerate particle filters and for the temperature management in $NO_x$—storage catalytic converters and as independent vehicle heaters or auxiliary heaters.

The burner according to the invention with the characteristics named in claim 1 and the procedure according to the invention offer in contrast the advantage, that the open-loop or closed-loop control of the amount of air delivered into the burner can be dispensed with and with it the required measures for such an open-loop or closed-loop control. In order to assure a safe and clean combustion of the fuel in the burner if a rather strong change in the air mass supplied to the burner occurs, for example, as a result of an aging of or the manufacturing tolerances of the secondary air fan, air fluctuations during operation of the motor vehicle at varying elevations above sea level or a change in the backpressure of the exhaust gas in the exhaust gas duct behind the burner at different engine operating points, the mass of fuel delivered into the burner is updated according to the invention if required during a change in output of the burner. That is to say, it is adjusted to the change in the air mass.

This updating is, however, only then required, if the change in the air supply endangers the stabile and low emission operation of the burner, which frequently is guaranteed at an air number in a range between approximately $\lambda=1$ and approximately $\lambda=1.5$. As long as the limits of this range are not exceeded, the fuel delivery into the burner can be held constant when only a slight change in the air supply to the burner occurs.

The fuel supply mechanism and the air supply mechanism are, therefore, laid out according to an advantageous embodiment of the invention for an operation of the burner with an air number between approximately $\lambda=1$ and approximately $\lambda=1.5$, preferably with an air number near the middle of this range. That is to say of approximately $\lambda=1.25$, so that a large as possible change of the air supply can be achieved without requiring a change in the fuel supply.

According to an additional preferred embodiment of the invention, the air being conveyed by the air delivery mechanism is delivered completely or with a fixed apportionment ratio, i.e. without a prior metering or flow control, into the burner, in order to keep the system as simple as possible. This means, that the air delivery mechanism, for example a secondary air fan, is either so designed, that the air number in the burner when conveying the entire air intake into the burner lies preferably between approximately $\lambda=1$ and approximately $\lambda=1.5$, or that independent of the air pressure a constant proportion of the air conveyed by the air delivery mechanism is set apart for delivery into the burner.

As the actual air mass delivered into the burner should be known in order to consequently adjust the fuel mass delivered into the burner (The fuel mass itself, however, does not necessarily have to be known.), the burner comprises preferably mechanisms for the direct or indirect recording of the actual air mass delivered to the burner. In the first case mentioned this is preferably an air mass meter disposed in an air supply line of the burner behind the secondary air fan; for example, a hot film air mass meter which directly measures the air mass supplied to the burner; while in the case last mentioned preferably with the help of pressure sensors, the pressure in an air supply line of the burner behind the secondary air fan and the prevailing pressure in a combustion chamber of the burner are measured. On the basis of the pressure difference between these pressures the air mass delivered into the burner is calculated.

However, alternatively the signal of a lambda sensor disposed in the exhaust gas stream behind the burner can be used for the adjustment to a desired air number, in that the open-loop or closed-loop control unit raises the fuel supply, if the signal of the lambda sensor indicates an elevation in the air number $\lambda$ of the burner to the vicinity of an upper range limit, for example, of approximately $\lambda=1.5$, and in that the control unit throttles the fuel delivery if the signal of the lambda sensor indicates a sinking of the air number to the vicinity of a lower range limit, for example approximately $\lambda=1$.

A cost effective possibility for metering the fuel into the burner in order to adapt to the air mass ascertained consists of using a conventional injection valve for an intake manifold injection system, whose pulsing is correspondingly adjusted by the open-loop or closed-loop control mechanism on the basis of the air mass, respectively air number, ascertained in each instance.

Figure 2:
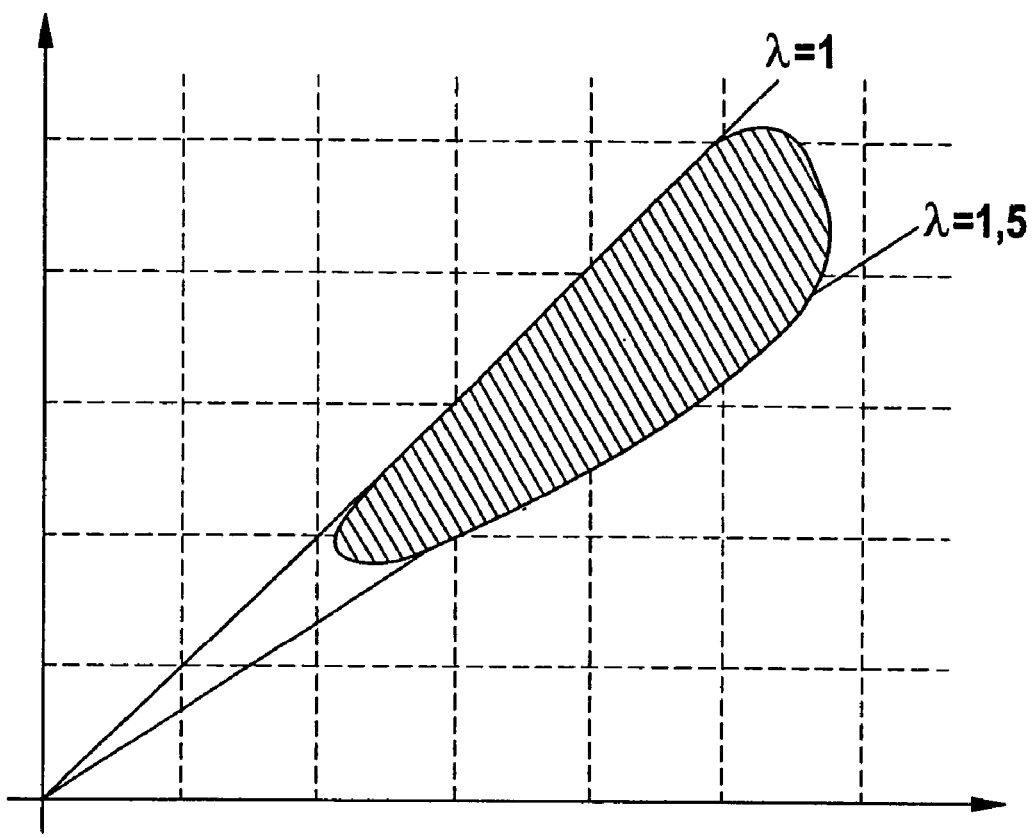

The invention is subsequently explained more thoroughly using the associated drawing. The following are shown:

In FIG. 1 a schematic view of parts of an exhaust gas duct of an internal combustion engine of a motor vehicle with a three way catalytic converter and a burner serving to rapidly heat up the catalytic converter;

In FIG. 2 a schematic representation of a desired operational range of the burner as a function of the air flow rate (abscissa) and the fuel flow rate (ordinate).

The exhaust gas duct of an internal combustion engine which is only partially depicted in FIG. 1 of the drawing comprises a three way catalytic converter 6 and a burner 8 serving to rapidly heat up the catalytic converter 6. The combustion chamber 10 of the burner 8 is connected by an exhaust gas pipe 12 with the front end of the catalytic converter 6 neighboring the internal combustion engine 4, so that the hot combustion gases produced in the combustion chamber as a result of putting the burner 8 into operation before or during cold starting of the internal combustion engine 4 can be delivered into the catalytic converter 6 in order to heat it up above the light-off-temperature.

For this purpose, the combustion chamber 10 of the burner 6 can be loaded with fuel by an injection valve. The fuel is delivered via a delivery line 16 from a fuel tank (not depicted) of the motor vehicle and is mixed with combustion air in the combustion chamber 10. The fuel-air-mixture, which is formed in the process, is ignited by means of a spark plug 17, so that it combusts in the combustion chamber 10, whereby the hot combustion gases flow through the exhaust gas pipe 12 into the catalytic converter 6.

A secondary air fan 18 serves to deliver the combustion air into the combustion chamber 10. The fan draws air from the surrounding environment and delivers it through an air supply line 20 into the combustion chamber 10, whereby the entire air flow conveyed by the secondary air fan 18 is channeled into the combustion chamber 10. Between the fan 18 and the combustion chamber 10, the air supply line 20 is equipped with an air mass meter 22 which measures the air mass flowing per unit of time through the air supply line 20 into the combustion chamber 10 during the operation of the burner 8. The measured air mass is transmitted, for example, to a control unit 24 which is integrated into a motor control unit of the internal combustion engine. This unit controls the opening times of the injection valve 14 as a function of the measured air mass.

In designing the burner 8, the fan 18 and the injection valve 14, the nominal conveyance output of the fan 18 is synchronized with the pulsing of the injection valve 14, i.e. with its injection amount and the opening intervals, in such a manner that the operational point of the burner 8 lies under normal conditions, for example at a normal air pressure at sea level and at an average exhaust gas backpressure, approximately in the middle of an operational range depicted in FIG. 2, in which the burner 8 works stably and with low emissions, i.e. in the depicted example at an air number of approximately $\lambda=0$. If the conditions change because the motor vehicle is, for example, not being operated at sea level, a change in the air mass being delivered per unit of time into the combustion chamber 10 results. This change is measured by the air mass meter 22 and transmitted to the control unit, which calculates the air number $\lambda$ for the operational point of the burner 8 resulting from the change in the air mass delivered into the combustion chamber 10. As long as the change in the air supply is only slight and does not result in the air number $\lambda$ leaving the operational range, which is depicted as an example in FIG. 2, with limits of approximately $\lambda=1$ and approximately $\lambda=1.5$, the pulsing of the injection valve 14 is held constant by the control unit 24. In the case of a marked approach on the limits or an exceeding of them, the pulsing of the injection valve 14 and with it the fuel mass delivered by the injection valve 14 per unit of time into the combustion chamber are, however, changed; and in fact in such a manner, that the operational point of the burner 8 is displaced back in the direction of the middle of the operational range. That is to say in the example depicted in FIG. 2, it is displaced in the direction of an air number of approximately $\lambda=1.25$. In other words, the output of the burner is changed.

As a function of the heat output required to heat up the catalytic converter and/or as a function of a higher air surplus requirement in the exhaust gas of the burner 8 for the after oxidation of non-combusted exhaust gas components in the exhaust gas of the internal combustion engine 4, a fuel-air-mixture can also be intentionally produced by a corresponding pulsing of the injection valve 14, whose air number $\lambda$ deviates from a specified middle value of the operational range, i.e. in the operational range depicted in FIG. 2 of $\lambda=1.25$. This is done because it can have a positive effect on the entire behavior.

Instead of measuring directly the air mass delivered into the combustion chamber 10 with the help of the air mass meter 22 in the air supply line 20 and calculating from it the air number $\lambda$ of the current operational point of the burner 8 in the control unit 24, this air mass can also alternatively be calculated from a pressure difference between the air pressure in the air supply line 20 and the pressure in the combustion chamber, whose pressures are measured with the help of pressure sensors (not depicted). Beyond this it is also possible to make provision for a lambda sensor (not depicted) in the exhaust gas stream of the burner 8, for example in the exhaust gas pipe 12, whose signals are delivered directly to a control unit 24, in order to adapt the fuel delivery into the burner 8 to a change in the air supply leading to a change in the air number $\lambda$ on the basis of the measured actual air number $\lambda$ in the exhaust gas of the burner 8 by changing the pulsing of the injection valve 14. As the signals of such a lambda sensor, however, are first available several seconds after putting the burner 8 into operation, when the sensor reaches its operating temperature, map-based pilot control values have to be worked with first in this case, whereby the deployment of an adaptive map-based pilot control lends itself well.

The invention claimed is:

1. A burner including a fuel supply mechanism to deliver a fuel mass to the burner, an air supply mechanism to deliver an air mass to the burner, and a closed-loop control mechanism for adjusting a desired fuel/air ratio in the burner, wherein the closed-loop mechanism adjusts the fuel mass delivered from the fuel supply mechanism to the burner in response to an actual air mass delivered from the air supply mechanism to the burner, and wherein the closed-loop control mechanism holds the fuel mass delivered from the fuel supply mechanism to the burner constant, when a change occurs in the actual air mass delivered from the air supply mechanism to the burner, only upon an air number $\lambda$ of the burner defined as a ratio of actual air mass to stoichiometric air mass being measured within a predetermined range, wherein when the air number $\lambda$ of the burner is outside of the predetermined range, the fuel mass is adjusted based on an actual air mass.

2. The burner according to claim 1, wherein the air mass conveyed from the air supply mechanism is entirely delivered into the burner or wherein a fixed apportionment ratio of the air mass conveyed from the air supply mechanism is delivered into the burner.

3. The burner according to claim 1, wherein the closed-loop mechanism adjusts the fuel mass delivered based upon the actual air mass delivered, which is measured using an air mass meter.

4. The burner according to claim 1, wherein the closed-loop mechanism adjusts the fuel mass delivered based upon a pressure difference ascertained by pressure sensors between a first pressure of the actual air mass delivered from the air supply mechanism to the burner and a second pressure in a combustion chamber of the burner.

5. The burner according to claim 1, wherein the closed-loop control mechanism adjusts the fuel mass delivered based upon a signal from a lambda sensor disposed in an exhaust gas stream of the burner.

6. The burner according to claim 1, wherein the fuel supply mechanism includes an injection valve, and the closed-loop control mechanism adjusts a pulsing of the injection valve based upon the actual air mass delivered from the air supply mechanism to the burner.

7. The burner according to claim 1, wherein the fuel supply mechanism and the air supply mechanism are configured for operation of the burner with an air number $\lambda$ between approximately 1 and 1.5.

8. The burner according to claim 1, wherein the fuel supply mechanism and the air supply mechanism are configured for operation of the burner as a function of a desired heat output or a desired air surplus requirement in an exhaust gas of the burner.

9. A motor vehicle having an auxiliary burner including a fuel supply mechanism to deliver a fuel mass to the burner, an air supply mechanism to deliver an air mass to the burner, and a closed-loop control mechanism for adjusting a desired fuel/air ratio in the burner, wherein the closed-loop mechanism adjusts the fuel mass delivered from the fuel supply mechanism to the burner in response to an actual air mass delivered from the air supply mechanism to the burner, and wherein the closed-loop control mechanism holds the fuel mass delivered from the fuel supply mechanism to the burner constant, when a change occurs in the actual air mass delivered from the air supply mechanism to the burner, only upon an air number $\lambda$ of the burner defined as a ratio of actual air mass to stoichiometric air mass being measured within a predetermined range, wherein when the air number $\lambda$ of the burner is outside of the predetermined range, the fuel mass is adjusted based on an actual air mass.

10. A method of operating a burner in which fuel and air are delivered by an air supply mechanism to the burner and inside the burner a desired fuel-air-mixture is set, wherein an actual air mass delivered by the air supply mechanism to the burner is ascertained directly or indirectly, wherein the fuel mass delivered to the burner is adjusted in response to the actual air mass that has been ascertained, and wherein closed-loop control mechanism holds the fuel mass delivered from the fuel supply mechanism to the burner constant, when a change occurs in the actual air mass delivered from the air supply mechanism to the burner, only upon an air number $\lambda$ of the burner defined as a ratio of actual air mass to stoichiometric air mass being measured within a predetermined range, wherein when the air number $\lambda$ of the burner is outside of the predetermined range, the fuel mass is adjusted based on an actual air mass.

* * * * *